(12) United States Patent  (10) Patent No.: US 8,084,006 B2
Hunsinger  (45) Date of Patent: Dec. 27, 2011

(54) METHOD AND DEVICE FOR ENTRAINED-FLOW SULFATION OF FLUE GAS CONSTITUENTS

(75) Inventor: Hans Hunsinger, Weingarten (DE)

(73) Assignee: Karlsruher Institut fuer Technologie, Karlsruhe (DE)

( * ) Notice: Subject to any disclaimer, the term of this patent is extended or adjusted under 35 U.S.C. 154(b) by 0 days.

(21) Appl. No.: 12/743,928

(22) PCT Filed: Oct. 24, 2008

(86) PCT No.: PCT/EP2008/008998
§ 371 (c)(1),
(2), (4) Date: May 20, 2010

(87) PCT Pub. No.: WO2009/065481
PCT Pub. Date: May 28, 2009

(65) Prior Publication Data
US 2010/0260654 A1  Oct. 14, 2010

(30) Foreign Application Priority Data
Nov. 23, 2007  (DE) .......................... 10 2007 056 580

(51) Int. Cl.
*B01D 53/34*  (2006.01)
*B01D 53/50*  (2006.01)
*B01D 53/68*  (2006.01)
*B01D 53/74*  (2006.01)
(52) U.S. Cl. ..................................... 423/242.1; 422/168
(58) Field of Classification Search ................ 423/242.1; 422/168
See application file for complete search history.

(56) References Cited

U.S. PATENT DOCUMENTS

| 4,355,017 A | 10/1982 | Gamson et al. |
| 4,579,070 A | 4/1986 | Lin et al. |
| 4,793,270 A | 12/1988 | Karasek et al. |
| 4,824,441 A | 4/1989 | Kindig |
| 6,649,135 B1 | 11/2003 | Staab et al. |

(Continued)

FOREIGN PATENT DOCUMENTS
DE  19802274 C2  9/1999
(Continued)

OTHER PUBLICATIONS

Griffin, A New Theory of Dioxin Formation in Municipal Solid Waste Combustion, Chemosphere, vol. 15, pp. 1987-1990, 1986.

(Continued)

*Primary Examiner* — Timothy Vanoy
(74) *Attorney, Agent, or Firm* — Leydig, Voit & Mayer, Ltd.

(57) ABSTRACT

A method for entrained-flow sulfation of sulfatable flue gas constituents of an oxygen-containing flue gas in an incineration plant having at least one combustion chamber and a waste gas burnout zone includes passing the oxygen-containing flue gas through the waste gas burnout zone. The oxygen-containing flue gas is tempered by lowering a temperature of the oxygen-containing flue gas. The oxygen-containing flue gas is passed through a sufation zone so that the oxygen-containing flue gas has a temperature interval of between 700 and 900° C. during a time period of between 2 and 20 s so as to convert sulfatable flue gas constituents present in the oxygen-containing flue gas to solid sulfate-containing ash particles so as to reduce a halide concentration in ash deposits thereof.

20 Claims, 8 Drawing Sheets

U.S. PATENT DOCUMENTS

| | | |
|---|---|---|
| 6,817,181 B2 | 11/2004 | Andersson |
| 6,924,408 B2 | 8/2005 | Lenoir et al. |
| 2003/0065236 A1 | 4/2003 | Vosteen et al. |
| 2007/0119352 A1 | 5/2007 | Martin et al. |
| 2008/0236458 A1 | 10/2008 | Hunsinger |
| 2009/0038310 A1 | 2/2009 | Aho |
| 2009/0208395 A1 | 8/2009 | Hunsinger |
| 2010/0260654 A1* | 10/2010 | Hunsinger ................ 423/240 R |

FOREIGN PATENT DOCUMENTS

| | | |
|---|---|---|
| DE | 19849021 A1 | 4/2000 |
| DE | 19849022 A1 | 4/2000 |
| DE | 19903510 A1 | 8/2000 |
| DE | 19953418 A1 | 5/2001 |
| DE | 10131464 B4 | 4/2006 |
| DE | 10338752 B9 | 6/2006 |
| DE | 60211476 T2 | 4/2007 |
| DE | 102006016963 B3 | 10/2007 |
| EP | 0193205 B1 | 7/1990 |
| WO | WO 8204036 A1 | 11/1982 |
| WO | WO 8905340 A1 | 6/1989 |
| WO | WO 02059526 A1 | 8/2002 |
| WO | WO 2006124772 A2 | 11/2006 |
| WO | WO 2006134227 A1 | 12/2006 |

OTHER PUBLICATIONS

International Search Report for PCT/EP2008/008998 mailed on Mar. 10, 2009.

Raghunathan et al., Role of Sulfur in Reducing PCDD and PCDF Formation, 1996 Environmental Science and Technology, 19960523 American Chemical Society, Easton, PA, US—ISSN 0013-936X, vol. 30, Nr: 6, pp. 1827-1834, XP002515494.

* cited by examiner

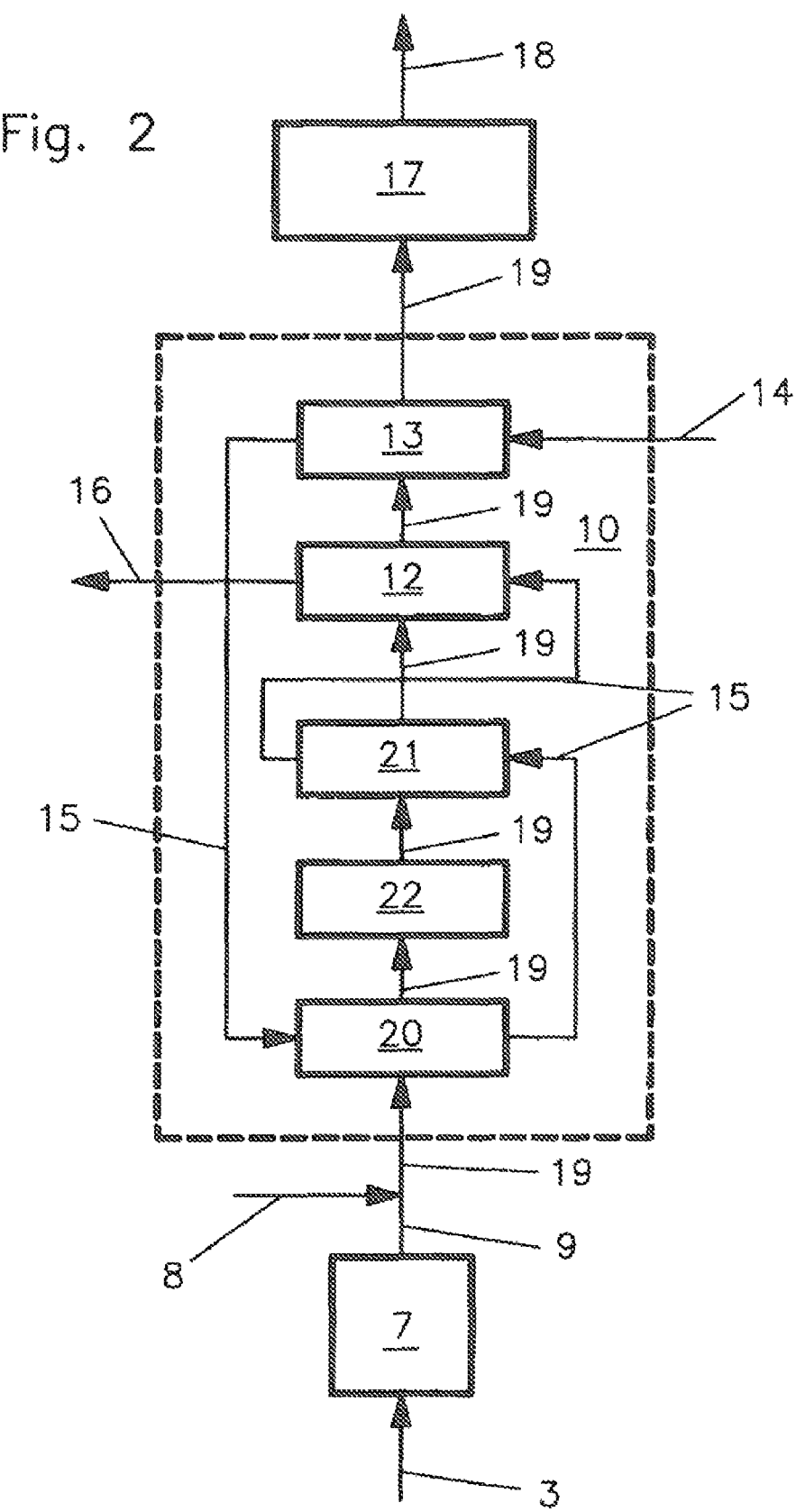

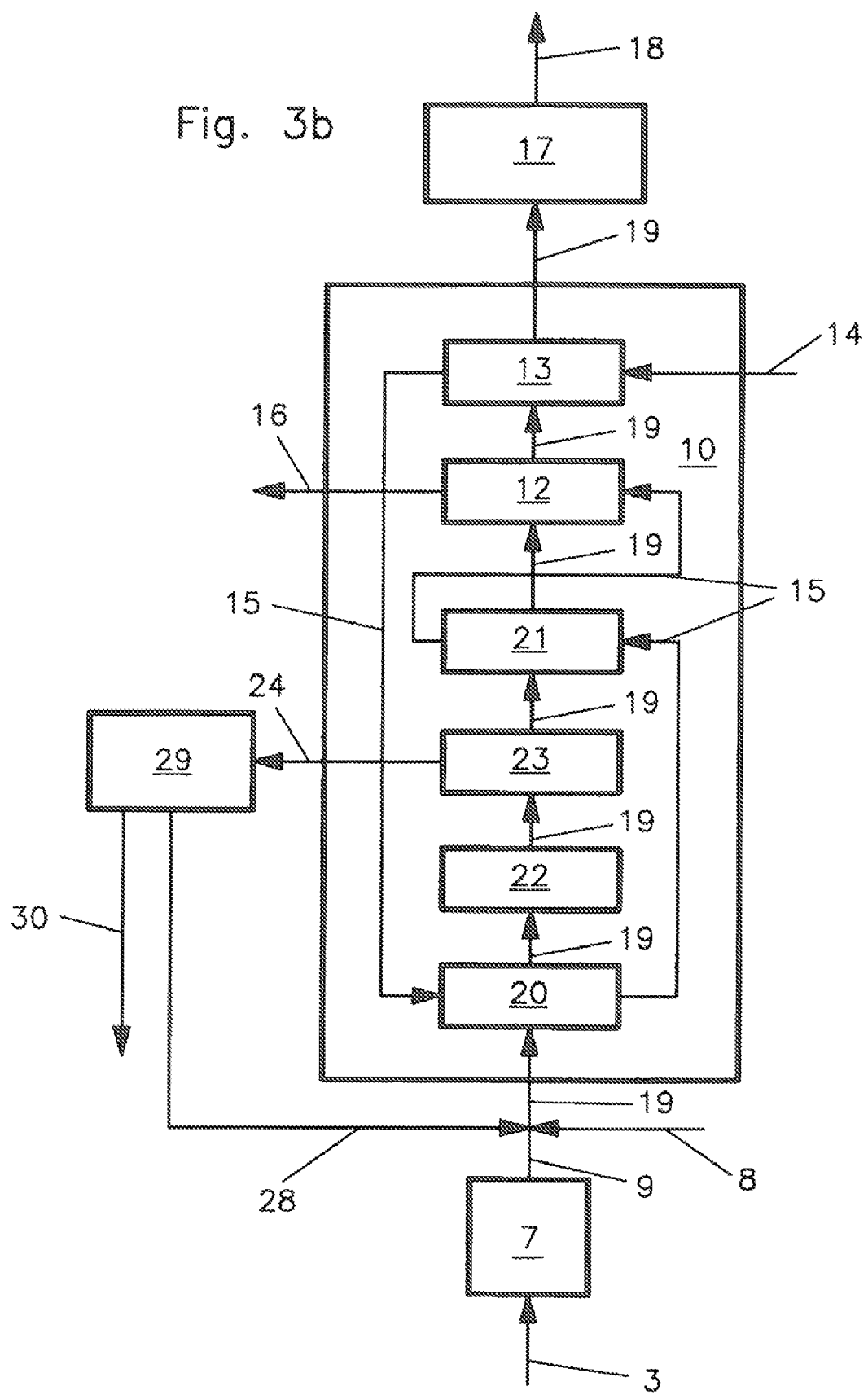

Fig. 9
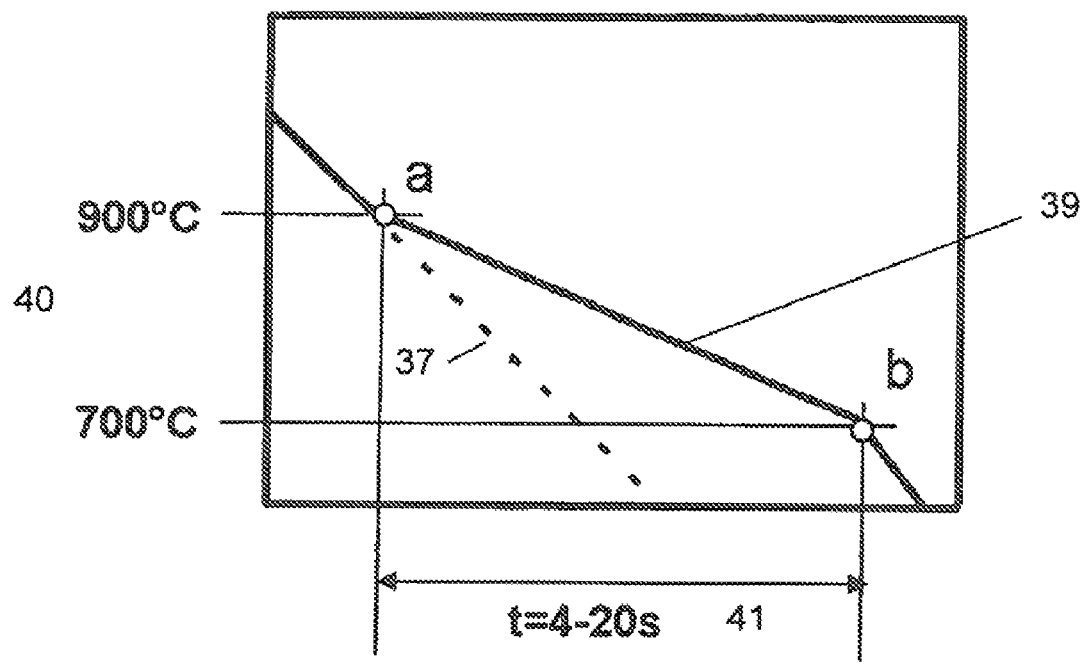
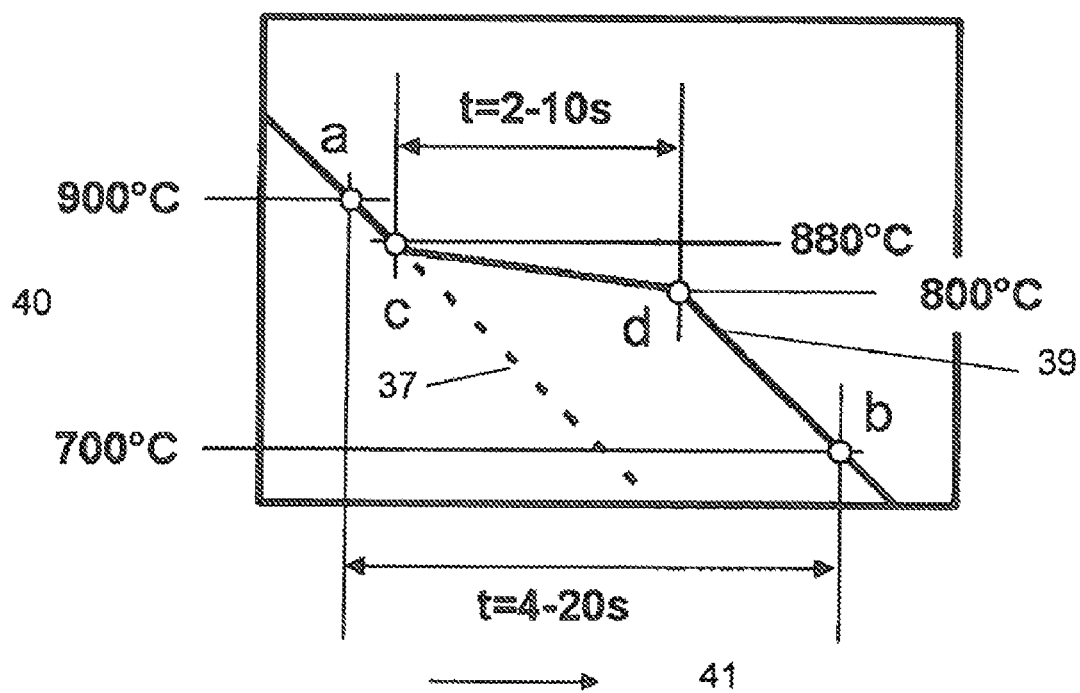

METHOD AND DEVICE FOR ENTRAINED-FLOW SULFATION OF FLUE GAS CONSTITUENTS

CROSS REFERENCE TO PRIOR APPLICATIONS

This application is a U.S. National Phase application under 35 U.S.C. §371 of International Application No. PCT/EP2008/008998, filed on Oct. 24, 2008 and which claims benefit to German Patent Application No. 10 2007 056 580.3, filed on Nov. 23, 2007. The International Application was published in German on May 28, 2009 as WO 2009/065481 A1 under PCT Article 21(2).

FIELD

The present invention relates to a method and a device for the entrained-flow sulfation of flue gas constituents in incineration plants having at least one combustion chamber.

BACKGROUND

The combustion of solid fuels in grate, fluidized bed and rotary kiln firing systems is generally carried out in two stages. The combustion of solid matter initially takes place in the first stage, accompanied by a mostly hypostoichiometric introduction of primary air. In this context, the solid fuel passes through the individual steps of drying, degasification of the volatile constituents, as well as burning-off of the fixed carbon.

The high calorific value gases produced during the combustion of solid matter are mixed in the second combustion stage, which is accompanied by the hyperstoichiometric introduction of secondary air at high temperatures and, as a result, are fully combusted.

Hydrochloric acid (HCl) and sulfur oxides ($SO_2$ and $SO_3$) are produced by the combustion of chlorine- and sulfur-containing fuels, such as household refuse or biomass (for example, wood and straw). The $SO_3$ content in proportion to $SO_2$ is mostly very low; relative to the total concentration of sulfur oxides ($SO_2+SO_3$), the $SO_3$ content is mostly less than 5%. Household refuse and, in particular, hazardous wastes can contain other halogen compounds, such as bromine and iodine compounds, in addition to chlorine compounds. Bromine and iodine compounds behave similarly to the chlorine compounds during combustion and cause similar problems.

The alkali metals (potassium and sodium) and other metals contained in the fuel partially produce chlorides during combustion of the solid matter. Under the high temperatures prevailing in the combustion bed, alkali and metal chlorides have a relatively high vapor pressure, so that considerable amounts thereof are released in the gaseous state into the waste gas.

The thermal energy of the hot combustion and wastes gases from an incineration is mostly utilized for heating a steam boiler. When heat is released, the combustion and waste gases are cooled, the saturation vapor pressure of the volatile inorganic compounds (alkali and metal chlorides) being fallen short of. As a result, these chloride compounds condense and/or resublimate and, together with the inert and carbon particles contained in the waste gas, produce a chloride-containing fly ash. This partially settles on the heat exchanger surfaces of the steam boiler and forms an undesirable coating. The deposited fly ash is essentially made up of complex mixtures of silicates, sulfates, oxides, carbonates and chlorides.

Generally, the chloride content in these ash deposits undesirably promotes the formation of chlorinated organic compounds, such as dioxins (PCDD/F), for example, and additionally causes considerable corrosion damage to the metallic components, particularly of the boiler. In this case, the alkali chlorides (NaCl and KCl) play a critical role due to their high concentration in the fuel, the flue gas and in the ash deposits. The formation of PCDD/F, as well as the corrosion of the metallic boiler material are both attributable to the formation of chlorine ($Cl_2$) within and underneath the fly ash deposits on the boiler surface. In addition, within and underneath these chloride-containing ash deposits on the boiler surface, chloride ($Cl_2$) is formed from the hydrochloric acid (HCl) contained in the waste gas by what is generally referred to as the Deacon process, due to a catalytic action of metal oxides/metal chlorides (in particular, Cu and Fe) contained in the fly ash.

Direct reactions of alkali chlorides with the mostly iron-containing boiler material likewise induce a significant $Cl_2$ formation. The $Cl_2$ generated brings about, in turn, an oxychlorination of the particulate carbon (soot particles) present in the ash deposits. This PCDD/F formation path, known as de novo synthesis, plays an absolutely critical role in the waste incineration process for the PCDD/F present in the raw gas. By avoiding the formation of $Cl_2$, the PCDD/F formation can be effectively suppressed, so that the need for expensive waste-gas purification processes for reducing PCDD/F can be substantially eliminated.

The $Cl_2$ formed within and underneath the chloride-containing boiler deposits has a very corrosive effect on metallic and, in particular, iron-containing boiler materials. What is generally referred to as the chlorine-induced boiler corrosion increases greatly with a rising wall temperature of the boiler made of metallic materials. Increased boiler corrosion is associated with considerable costs which, in turn, significantly limits the range of steam parameters (temperature T and pressure p) in the steam generation, particularly in the waste incineration process. Consequently, boilers of waste and biomass incineration plants are mostly operated at only relatively low steam qualities of T=400° C., p=40 bar, which also greatly limits the thereby attainable efficiency when generating electrical energy by steam turbines.

As a function of the waste gas composition and the prevailing combustion temperatures in and downstream of the waste gas burnout zone following the burnout of solid matter, alkali hydroxides may be formed from the alkali chlorides released from the combustion bed in accordance with the following reaction equations (1) and (2).

$$KCl+H_2O \rightarrow KOH+HCl \quad (1)$$

$$NaCl+H_2O \rightarrow NaOH+HCl \quad (2)$$

In and downstream of the waste gas burnout zone, the alkali metals (potassium, sodium) may be present as chlorides and/or hydroxides. In this context, a portion of the alkali hydroxides react further in the high-temperature range in and downstream of the waste gas burnout zone in the oxidizing atmosphere, both with the $SO_2$ contained in the waste gas, as well as with HCl, to form chlorides and sulfates in accordance with the following reaction equations:

$$2KOH+SO_2+\tfrac{1}{2}O_2 \rightarrow K_2SO_4+H_2O \quad (3)$$

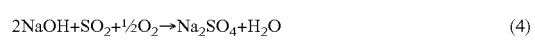
$$2NaOH+SO_2+\tfrac{1}{2}O_2 \rightarrow Na_2SO_4+H_2O \quad (4)$$

$$KOH+HCl \rightarrow KCl+H_2O \quad (5)$$

$$NaOH+HCl \rightarrow NaCl+H_2O \quad (6)$$

The formation of alkali chlorides and/or sulfates in and downstream of the waste gas burnout zone depends in this context on the ratio of $SO_2$/HCl concentrations and on the local process conditions (temperature and cooling rate of the waste gas).

To avoid the aforementioned undesired chemical reactions that lead to the formation of chloride-containing substances and the unwanted effects resulting therefrom, efforts are directed to increasing the $SO_2$ concentrations in the combustion gas. A method for reducing the dioxin formation in combustion processes by increasing the $SO_2$ concentration in the flue gas was described for the first time in 1986 by Griffin (Griffin R. D.: A new theory of dioxin formation in municipal solid waste combustion; Chemosphere, vol. 15, issue 9-12 (1986) pages 1987-1990). It was theorized therein that $Cl_2$ is reduced by reaction with $SO_2$ as a result of the subsequent homogeneous gas phase reaction.

$$Cl_2+SO_2+H_2O \rightarrow SO_3+2HCl \quad (7)$$

In known combustion systems, the $SO_2$ concentration is increased by adding sulfur-containing fuels, sulfur or sulfur compounds to the combustion. Recent investigations show the sulfation of the fly ash, and thus the reduction of the chloride content of this fly ash and of the fly ash deposits, is the critical reaction for reducing or avoiding the formation of $Cl_2$. Particularly at high temperatures, the chlorides undergo sulfation at a high reaction rate by the $SO_2$ contained in the flue gas, whereby sulfates are formed and HCl is released in accordance with the following equations.

$$2NaCl+SO_2+\tfrac{1}{2}O_2+H_2O \rightarrow Na_2SO_4+2HCl \quad (8)$$

$$2KCl+SO_2+\tfrac{1}{2}O_2+H_2O \rightarrow K_2SO_4+2HCl \quad (9)$$

U.S. Pat. No. 4,793,270 describes introducing $CS_2$, CaS and $SO_2$ into the incineration process to reduce the dioxin formation rate in the course of a waste incineration.

DE 199 53 418 A1 describes adding amidosulfuric acid and sulfonamide to the fuel to reduce dioxins in the waste gas of chemical processes.

To reduce corrosion, DE 198 49 022 A1 describes introducing sulfur-containing chemicals, such as $SO_2$ and $MgSO_4$, into the combustion gas.

DE 602 11 476 T2 (from WO 02/059526) describes adding a sulfur-containing chemical, such as $(NH_4)_2SO_4$, $NH_4HSO_4$, $H_2SO_4$ or $FeSO_4$, to reduce corrosion.

DE 101 31 464 B4 describes a method for the low-corrosion and low-emission co-incineration of highly halogenated wastes in waste incineration plants which provides for adding sulfur or sulfur-containing chemicals.

DE 198 02 274 C2 describes a method for reducing corrosion during operation of a boiler of a waste incineration plant, where sulfur or sulfur-containing compounds are introduced into the combustion chamber or the hot waste gases before reaching the corrosion-prone heating surfaces.

WO 06/124772 A2 and WO 06/134227 A1 describe adding $Fe(SO_4)_3$, $Al_2(SO_4)_3$, and/or $SO_2$, $SO_3$, $H_2SO_4$, sulfur or sulfur salts to reduce corrosion in steam boilers.

In principle, the co-incineration of sulfur, sulfur compounds or sulfur-containing fuels (such as municipal sewage sludge, discarded waste tires or sulfur-containing coal) or the charging of $SO_2/SO_3$, $H_2SO_4$ or other sulfur-containing compounds, for example $(NH_4)_2SO_4$, into the waste gas takes place before entry into the steam boiler.

DE 103 38 752 B9 describes a process-integrated $SO_2$ cycle in the course of a waste incineration that does not require any external charging of sulfur or sulfur compounds.

All methods are based on the fact that the sulfation, and thus the reduction of the chloride content of the fly ash and boiler ash deposits, is achieved with increasing $SO_2$ and/or $SO_3$ concentration in the flue gas. Generally, it is disadvantageous that, in existing incineration plants, relatively high $SO_2$ and/or $SO_3$ concentrations in the waste gas are required in proportion to the HCl and to the compounds to be sulfated, such as alkali, alkaline-earth and metal compounds.

EP 0 193 205 B1 describes a circulating fluidized-bed combustion in which sulfur-containing fuels are burned while alkaline sorbents (CaO) are added to the fluidized bed to separate sulfur compounds. The dwell time of the combustion gases in the primary combustion zone is 1-3 s (650-1095° C.) and, in the waste gas burnout zone, 0.2-2 s. A special sulfide/sulfate solids oxidation zone is configured as a dense-phase fluidized bed in the solids return line of the cyclone leading to the fluidized bed. The alkali sulfide contained in the separated solids is oxidized by the introduction of air in this oxidation fluidized bed into sulfate at waste gas temperatures ranging from 590-985° C. and solid residence times from 1-30 s.

WO 1982/04036 describes a method for recovering fluorine from the carbonaceous material from the linings and/or cathodes of reduction cells, where the fluorine is liberated as gaseous hydrogen fluoride by heating the carbonaceous material in the presence of oxygen, water and sulfur dioxide. The reaction time is approximately one hour.

WO 1989/05340 describes a carbonaceous fuel composition. During combustion accompanied by the addition of Ca and Mg compounds, as well as of an oxidation catalyst, a reduction in sulfur oxide and nitrogen oxide emission is achieved.

SUMMARY

An aspect of the present invention is to provide a method or a device for a entrained-flow sulfation of sulfatable flue gas constituents and to thereby reduce or minimize the formation of chloride-containing ash deposits while reducing the use of sulfur oxides.

In an embodiment, the present invention provides a method for entrained-flow sulfation of sulfatable flue gas constituents of an oxygen-containing flue gas in an incineration plant having at least one combustion chamber and a waste gas burnout zone which includes passing the oxygen-containing flue gas through the waste gas burnout zone.

The oxygen-containing flue gas is tempered by lowering a temperature of the oxygen-containing flue gas. The oxygen-containing flue gas is passed through a sufation zone so that the oxygen-containing flue gas has a temperature interval of between 700 and 900° C. during a time period of between 2 and 20 s so as to convert sulfatable flue gas constituents present in the oxygen-containing flue gas to solid sulfate-containing ash particles so as to reduce a halide concentration in ash deposits thereof.

BRIEF DESCRIPTION OF THE DRAWINGS

The present invention is described in greater detail below on the basis of embodiments and of the drawings in which:

FIG. 2: the process flows in accordance with FIG. 1, however, including a sulfation stage integrated in the evaporator section;

DETAILED DESCRIPTION

Figure 1:
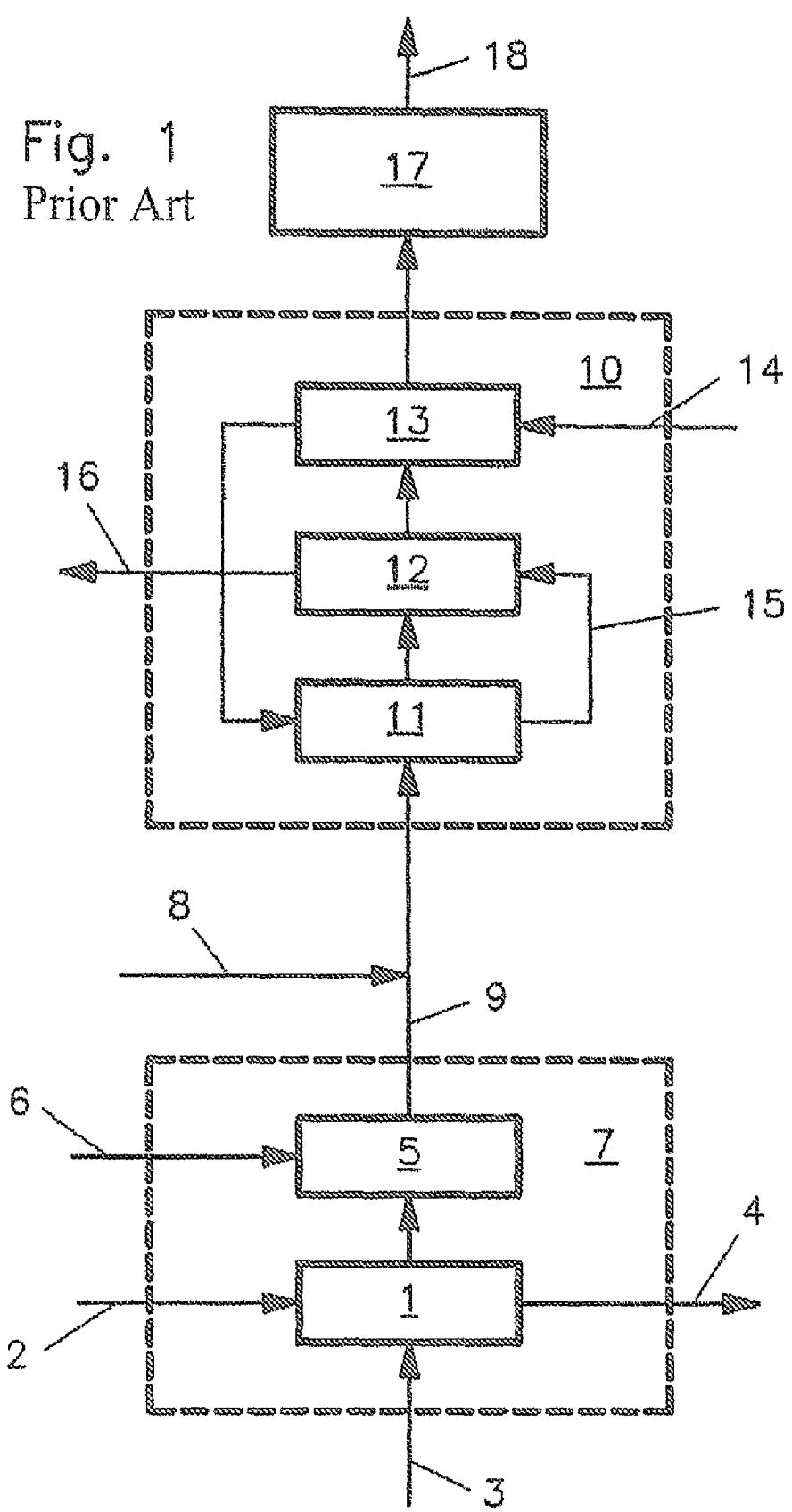
FIG. 1: the process flows of the method in a schematically illustrated device, accompanied by an addition of sulfur dioxide in accordance with the prior art.

Once they have passed through the waste gas burnout zone, for example, following an introduction of secondary gas, and before they have been routed to a corrosion-sensitive metallic heat-exchange surface of a heat exchanger, for example, of a boiler, the flue gas and the flue gas constituents contained therein should be directed to a reaction zone in a reaction chamber, where, for over a time period of between 4 and 20 seconds, they are maintained at a reaction temperature within a temperature window of between 700 and 900° C., for example, between 750 and 880° C., in which temperatures ranging from 800 to 880° C. take up a time slice of, for example, between 2 and 10 seconds. Within the time and temperature window in question, the predominantly gaseous sulfatable flue gas constituents, together with the $SO_2/SO_3$ contained in the waste gas, are efficiently converted to solid sulfates, and, in fact, advantageously continuously during the process of flowing through the reaction chamber. Metal and/or alkaline earth and/or alkali chlorides, metal and/or alkaline earth and/or alkali carbonates, metal and/or alkaline earth and/or alkali oxides and/or metal and/or alkaline earth and/or alkali hydroxides are, for example, converted to sulfates which are significantly less corrosive than chlorides. The sulfation induces a significant decrease in the chloride content in the solid particles formed in the flue gas and in the solid deposits on the boiler surface, whereby the $Cl_2$ formation and thus the aforementioned corrosive effect, as well as the PCDD/F formation likewise decrease considerably.

The sulfatable flue gas constituents, such as chlorides, carbonates, oxides and/or hydroxides, are initially converted into sulfates. To make possible a complete sulfation of the sulfatable flue gas constituents contained in the flue gas, the $SO_2$ and/or $SO_3$ concentration in the combustion or flue gas should at least be in a stoichiometric ratio to the sum of the concentrations of all of the sulfatable compounds contained in the flue gas, such as metal, alkaline earth and alkali compounds, in particular of Ca, Na, K and of metals, such as Pb, Zn, Cu, for example.

A sulfation of metal chlorides, such as $CuCl_2$, $ZnCl_2$ or $PbCl_2$, for example, mostly requires significantly smaller quantities of sulfur dioxide in comparison to a sulfation of CaO, NaCl and KCl. This situation is due to the mostly substantially different absolute concentrations of these individual compounds in the flue gas (dependent upon the fuel composition and the combustion conditions when the solid matter is combusted). In addition, the sulfation efficiency is not only influenced by the $SO_2$ and/or $SO_3$ concentration, but also substantially by the temperature and the cooling rate of the hot flue gas.

The $SO_2/SO_3$ concentration in the flue gas depends to a large degree on the sulfur content and the binding form of the sulfur in the fuel. In the case of low-sulfur fuels, such as natural wood, for example, the adjustment is made to ensure a complete conversion of the sulfatable flue gas constituents by the controlled addition of sulfur-containing compounds to the flue gas upstream of the reaction chamber and/or by the co-combustion of sulfur-containing fuels, which release $SO_2$ and/or $SO_3$ during combustion. The $SO_2$ concentration in the flue gas can, for example, be measured downstream of the boiler and adjusted by employing the aforementioned measures in such a way that the measured $SO_2$ concentration is between 50 to 2,000 mg/Nm³, for example, within the range from 100 to 1,000 mg/Nm³. This also includes a recycling of $SO_2/SO_3$, respectively sulfur compounds (which, in the course of thermal decomposition, release $SO_2$ and/or $SO_3$) into the flue gas upstream of the sulfation zone, from the flue-gas purification stages downstream of the reaction chamber, an advantageous process-integrated cycle of $SO_2/SO_3$ resulting, and thus a significant reduction in the addition and removal of sulfur compounds being achieved in an economically and ecologically advantageous manner.

Within the scope of the present invention, the method is devised in such a way that, in the case of the sulfation of the flue gas constituents and, as a result, minimization of the chloride concentration in the fly ash, the flue gas stream does not exceed or fall below a predefined temperature range, nor a dwell time range, which is oriented to optimal process parameters of the aforementioned sulfation. In this manner, the sulfur dioxide component in the waste gas is advantageously completely usable for the sulfation taking place, for example, within this process parameter range. As a result of this adherence to process parameters in a reaction chamber, there is no longer a need for a significant excess of sulfur dioxide.

The reaction chamber, can, for example, be composed of a channel or a channel system. The length of the channels can calculated from the product of the flow rate of the flue gas and of the stipulated dwell time in the reaction zone.

To operate the reaction chamber in the optimal sulfation temperature region, for example, as isothermally as possible, the cooling of the flue gas by the dissipation of heat in the reaction chamber to the ambient environment or to a heat exchanger integrated in the construction of the wall of the reaction chamber (channel wall) should be minimized. The discharging heat quantity Q is calculated as $$Q = k \cdot A \cdot \Delta T \tag{10}$$

(k=overall heat-transfer coefficient, A=heat-transfer surface, ΔT=temperature difference between the inner wall (wall surface having contact with the flue gas) and outer wall (wall surface having contact with the ambient environment or a heat exchanger) of a refractory lining of the reaction chamber having an insulating effect. This may be accomplished by a thick reaction chamber that is constructed with a refractory lining having good insulating properties, which has a low overall heat-transfer coefficient and/or small heat-exchange surface (small length-to-diameter ratio of the channel). Porous refractory materials, such as corundum- and/or SIC-containing ramming materials, for example, having relatively low overall heat-transfer coefficients, without or with rear ventilation, can be advantageous.

The temperature in the reaction zone should correspond to a reaction temperature in the aforementioned temperature intervals. The requisite reaction temperature can be ensured in that the reaction chamber and/or the walls of the channel or of the channel system are designed to include an insulation, such as an insulating lining made of refractory material. In addition, the reaction chamber or sections thereof optionally features an auxiliary electrical or pyrotechnic heating for maintaining the requisite temperature interval or, for example, a specific temperature.

The temperature of flue gas as it enters into the reaction chamber may be regulated by the specific quantity of combustion air (ratio of combustion air to fuel=air ratio), by the flue-gas recirculation of cold flue gas downstream of the boiler back into the combustion system, or by adding water (evaporation cooling) into the waste gas upstream of the reaction chamber.

A complete conversion of the sulfatable flue gas constituents, for example, of the volatile alkali chlorides, alkali hydroxides and metal chlorides to solid sulfates and, as a result, minimization of the chloride concentration in the fly ash, additionally requires a thorough mixing of the $SO_2$ and/or $SO_3$ in the oxygen-containing flue gas and the flue gas constituents to be sulfated.

In addition, the method can, for example, include a separation of the solid sulfate-containing fly ash from the flue gases using a dust collector that is, for example, configured directly following the reaction chamber or downstream of the boiler. Electrostatic separators, hot-gas cyclones or filtering separators (metallic or ceramic fibers, or membrane filters or granular ceramic filters and granular-bed filters), as well as combinations of these methods can be used.

Downstream of the reaction chamber, following the conversion of the alkali hydroxides, alkali and metal chlorides, which are present in the gaseous state at high temperatures, into solid sulfate particles, the flue gas can, for example, be directed through a hot gas filter, the solid flue gas constituents, such as the solid sulfate particles, together with the residual fly ash particles, being separated from the hot flue gas and discharged. This can, for example, take place prior to the feeding of the flue gas to a heat exchanger or steam generator, which typically has metallic heat-transfer surfaces that are in direct contact with the flue gas. A coating formation due to the condensation and/or resublimation of volatile flue gas constituents on the colder heat exchange surface caused by individual volatile flue gas constituents falling below the individual saturation concentration, as well as by the deposition of solid particles, for example, on these heat-transfer surfaces, is virtually completely avoided by the filtering, as is a dioxin formation, as well as a chlorine-induced boiler corrosion at the metallic heat exchanger. By avoiding or significantly reducing a coating formation, one derives the further advantage of a generally more efficient heat transfer associated therewith in the heat exchanger or steam generator.

The solid sulfatable flue gas constituents can, for example, be separated in the hot gas filter at temperatures ranging from 500 to 800° C., for example, from 600 to 700° C.

The sulfatable ash particles, can, for example, be separated from the flue gas by hot gas filtration following a dwell time in the reaction chamber. In this case, a hot gas filter is configured downstream of the reaction chamber or integrated at the end of the same.

An embodiment of the present invention provides for the hot gas filter to be integrated in the heat exchanger or steam generator. A heat exchanger having an integrated hot gas filter is likewise conceivable.

In another process step, the separated and discharged sulfatable ash particles may be heated to a temperature at which the sulfates of the sulfatable fly ash decompose and $SO_2$ and/or $SO_3$ are released. The $SO_2$ and/or $SO_3$ formed can, for example, be reintroduced into the combustion process in the flue gas upstream of the reaction chamber, for example, into the waste gas burnout zone, and are again available for a sulfation of the flue gas constituents to be sulfated. In the course of the thermal treatment of the sulfatable flue gas constituents, such as ash from waste incineration plants containing a relatively high concentration of $SiO_2$ and/or $Al_2O_3$, a mixture of (heavy) metal compounds, alkali, alkaline earth silicates and/or alkali, alkaline earth aluminum silicates is predominantly produced in accordance with the following reaction equations:

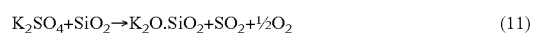

$$K_2SO_4 + SiO_2 \rightarrow K_2O \cdot SiO_2 + SO_2 + \tfrac{1}{2}O_2 \quad (11)$$

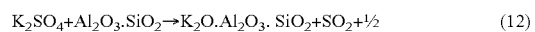

$$K_2SO_4 + Al_2O_3 \cdot SiO_2 \rightarrow K_2O \cdot Al_2O_3 \cdot SiO_2 + SO_2 + \tfrac{1}{2} \quad (12)$$

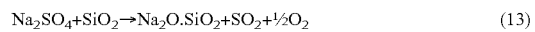

$$Na_2SO_4 + SiO_2 \rightarrow Na_2O \cdot SiO_2 + SO_2 + \tfrac{1}{2}O_2 \quad (13)$$

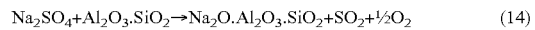

$$Na_2SO_4 + Al_2O_3 \cdot SiO_2 \rightarrow Na_2O \cdot Al_2O_3 \cdot SiO_2 + SO_2 + \tfrac{1}{2}O_2 \quad (14)$$

The discharged sulfated ash is thermally treated above the sulfate decomposition temperature of the sulfated fly ash, for example, between 900 and 1300° C. or between 900 and 1100° C. The efficiency of the thermal decomposition, accompanied by the release of $SO_2$ and/or $SO_3$ by ash having a low Si and Al content, may be enhanced by the incorporation of inert particles, such as, $SiO_2$ and/or $Al_2O_3$, and the sulfate decomposition temperature of the sulfate-containing fly ash can be lowered.

FIG. 1 schematically depicts a conventional method including a two-stage combustion process 7 that encompasses a fixed-bed burnout zone 1, including an introduction of solid fuel 2, an introduction of primary air 3, and a removal of slag 4, as well as a gas burnout zone 5, including an introduction of secondary air 6. Following the flue gas burnout, sulfur dioxide or sulfur-containing compounds 8 are added to waste gas 9, and routed for purposes of heating a steam boiler 10, in which a heat transfer to an evaporator 11, a superheater 12 and a preheater 13 (economizer) take place, for example, in the sequence mentioned. Evaporator 11 and superheater 12 may also be configured in reverse sequence. The water to be heated in the steam boiler is passed from water infeed 14 into preheater 13; from there, into evaporator 11; from there, as saturated steam flow 15 into superheater 12 and, as superheated steam flow 16, to a steam turbine, for example. The waste-gas purification in a waste-gas purification system 17 and emission 18 of the waste gas take place on the waste-gas side, downstream of the steam boiler.

FIG. 2 illustrates a modified schematic process diagram of an embodiment in the area of steam boiler 10 in connection with FIG. 1. In this context, the steam boiler has two evaporator stages 20 and 21 which are serially traversed by the flow of flue gas stream 19 (waste gas stream). First evaporator stage 20 is merely used for lowering the temperature to a reaction temperature in the aforementioned temperature intervals and is designed to allow the heat dissipation to temper the waste gas stream to a temperature of about 900° C., for example, to 880° C. However, before it is introduced into second evaporator stage 21, the flue gas passes through a sulfation zone 22, for example, of a reaction chamber of the aforementioned type, into which the waste gas enters at a temperature of about 900° C. and from which it emerges following a dwell time of 4 to 20 seconds at a temperature of about 700° C. The chamber can, for example, be thermally designed to allow the waste gas to dwell in the chamber at temperatures ranging from 880 to 800° C. for 2 to 10 s. In the process, the sulfatable flue gas constituents in the waste gas stream undergo the aforementioned sulfation, the volatile alkali hydroxides, in particular, as well as the alkali and metal chlorides being converted into solid sulfates. Since the sulfation zone is not followed by any optional hot gas filtration and, for example, only by a slight heat dissipation (compare FIG. 3, for example), the flue gas (waste gas) laden with solid, sulfate-containing ash particles enters second evaporator stage 21 at the aforementioned exit temperature, in order to then pass through the superheater, preheater and the waste-gas purification, as clarified with reference to FIG. 1. Given a good thermal insulation between the flue gas and the heat-exchange surface of the evaporator, the reaction chamber may then, for example, be integrally configured in a shared evaporator stage (evaporator stages 20 and 21 are designed as one stage).

Figure 3A:
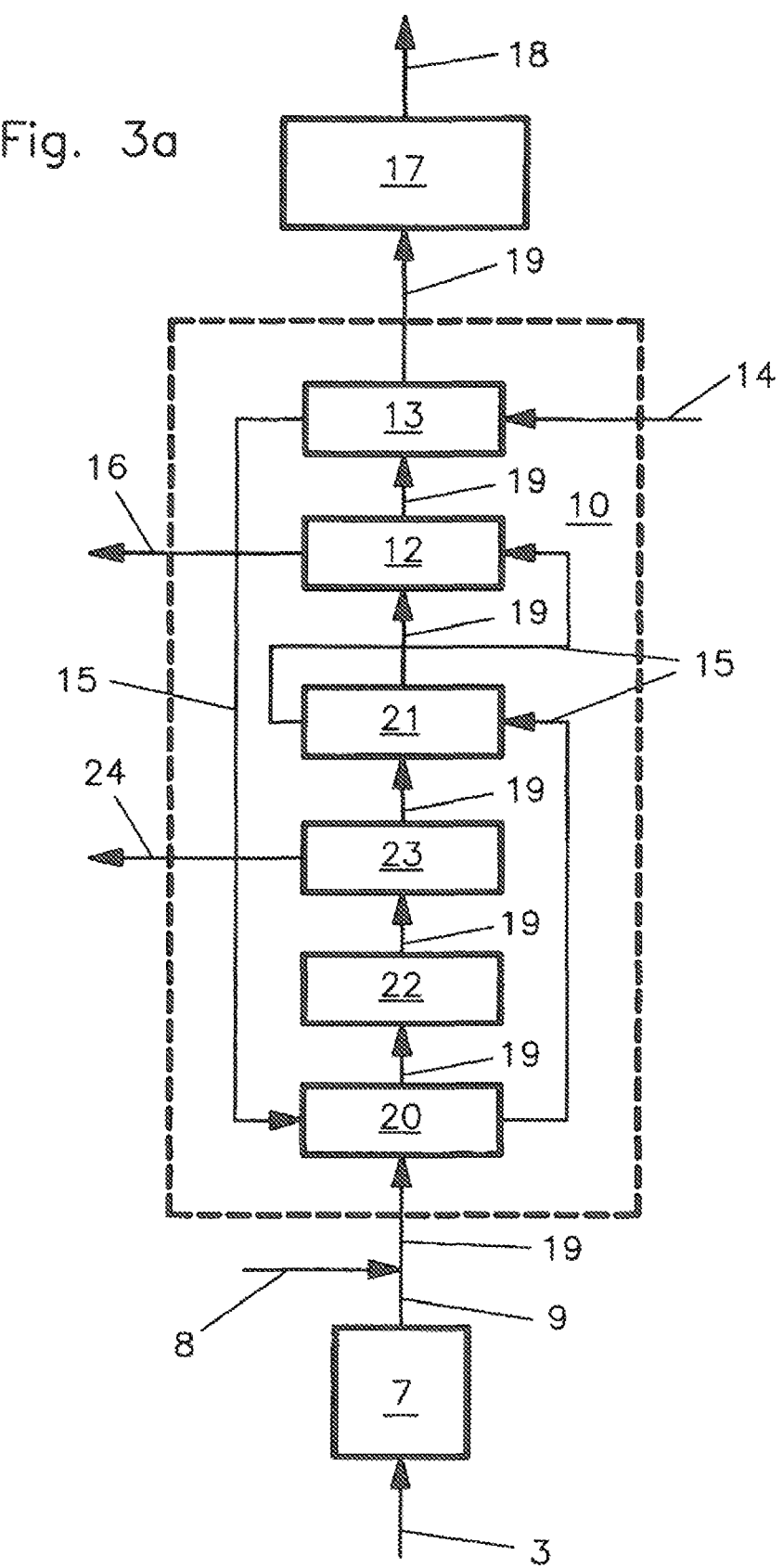
FIGS. 3a and b: the process flows in accordance with FIG. 2, however, additionally including a high-temperature dedusting (a and b), as well as an additional recycling of $SO_2/SO_3$ (b)

The process variant illustrated in FIG. 3a differs from that represented in FIG. 2 by a dust separation employing a dust separator 23 for the aforementioned sulfatable ash particles 24 between sulfation zone 22 and second evaporator stage 21. Through the use of a separate, ideally isothermal dust separator 23, flue gas stream 19 (waste gas stream) does not lose any usable heat for the subsequent heat transfers, i.e., in the second evaporator, the superheater and the preheater. Given a good thermal insulation between the flue gas and the heat-exchange surface of the evaporator, reaction chamber 22 and hot gas filter/dust seperator 23 may, for example, be integrally configured in a shared evaporator stage (evaporator stages 20 and 21 are designed as one stage).

In an embodiment of the present invention, the process variant illustrated in FIG. 3a is able to be supplemented by an $SO_2/SO_3$ recycling 28 (compare FIG. 3b), sulfate ash particles 24 from the hot gas filter/dust separator 23, initially, for example, with $Al_2O_3$ and/or $SiO_2$, being fed to a thermal decomposition 29, where, at temperatures above 900° C., for example, above 950° C., or between 950 and 1100° C., for example, up to 1300° C., accompanied by the release of $SO_2$ and/or $SO_3$ and oxygen, in accordance with aforementioned equations (11) through (14), a mixture of (heavy) metal compounds, alkali silicates, alkaline earth silicates and/or alkali aluminum silicates, alkaline earth aluminum silicates is produced (silicate discharge 30).

Figure 4:
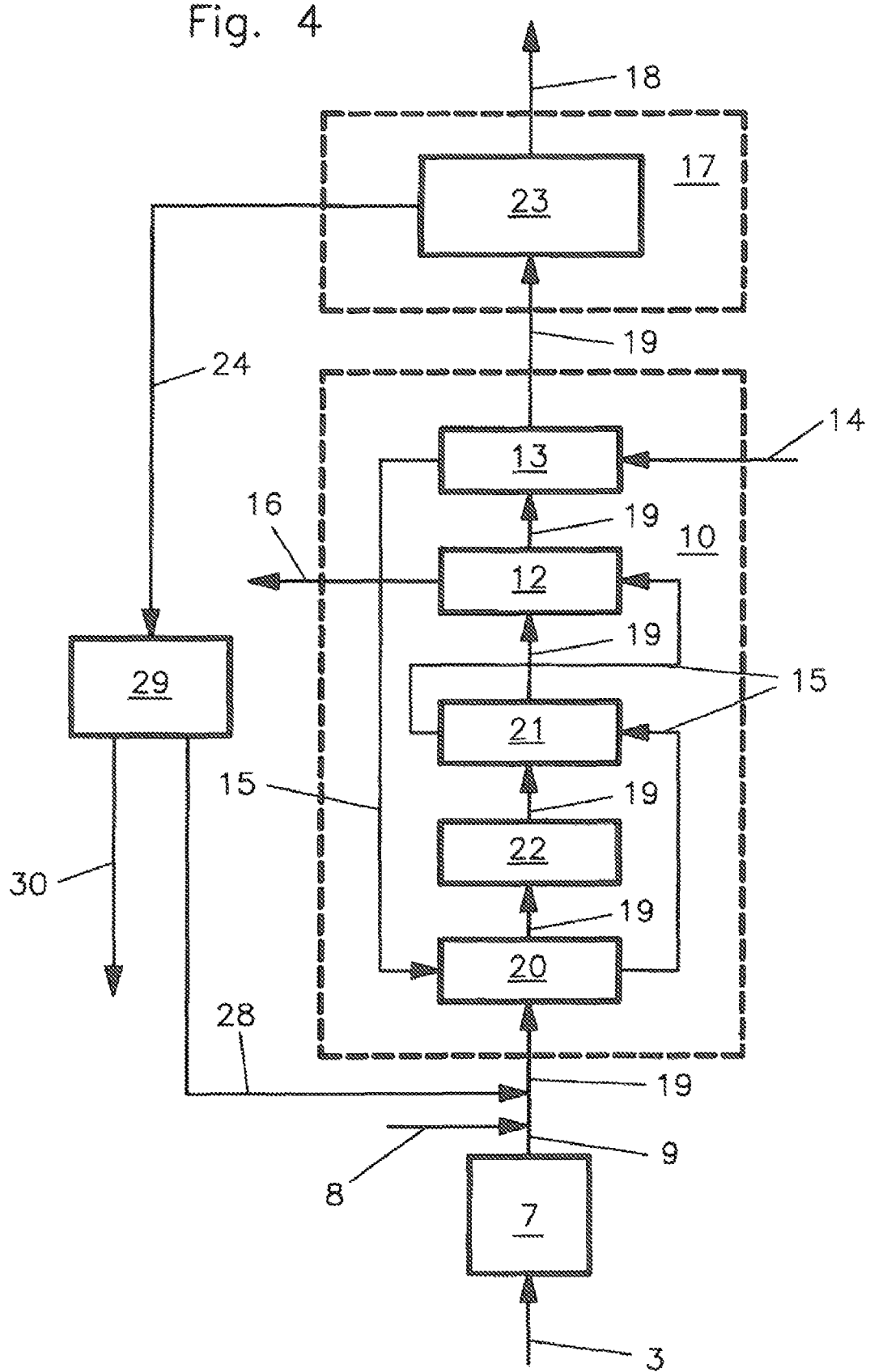
FIG. 4: the process flows in accordance with FIG. 2, however, additionally including a dedusting following a heat utilization, and an additional recycling of $SO_2/SO_3$.

The process steps mentioned with reference to FIG. 3b and the lines, conveyance means and reaction vessels required by the same for a $SO_2/SO_3$ recycling 28, a thermal decomposition 29, as well as a silicate discharge 30, may also be integrated into the schematic process diagram in accordance with FIG. 2. To this end, however, a dust separator 23 is required, for example, in the course of waste-gas purification 17 (compare FIG. 4). The sulfated ash particles separated here are fed to thermal decomposition 29 in the manner described above, and the reaction products produced are passed on, as previously mentioned, as $SO_2/SO_3$ recycling 28, and as silicate discharge 30.

Figure 8:
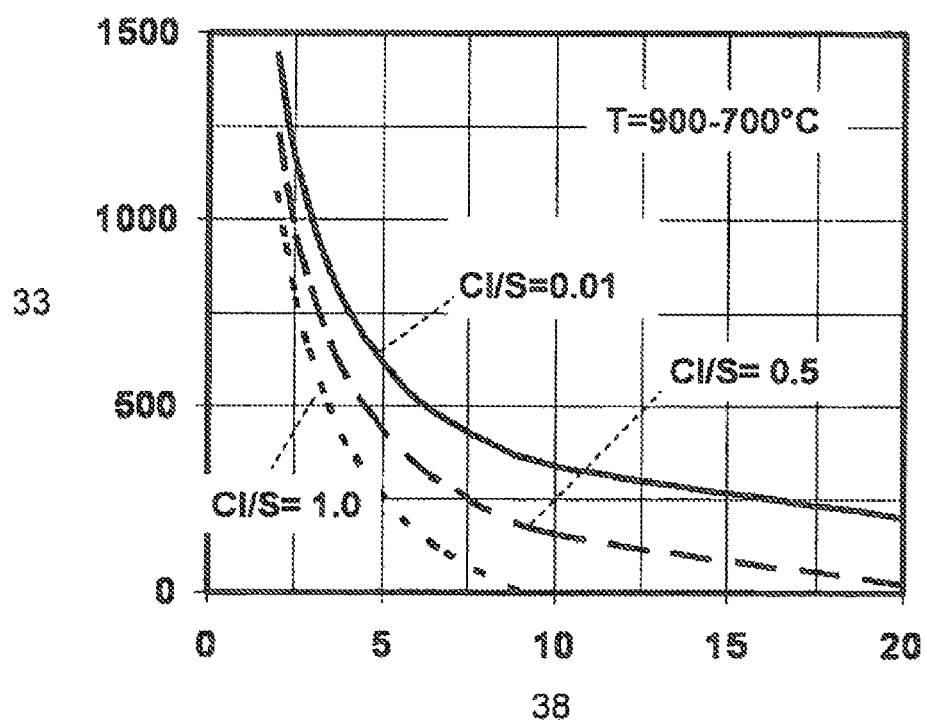
FIG. 8: the $SO_2$ concentration required in the flue gas for a sulfation of sulfatable flue gas constituents of a waste incineration downstream of the boiler for the flue gas dwell time in the temperature interval of between 700 and 900°, in seconds, as well as FIG. 9: the basic temperature profiles of a flue gas; flue gas cooling curves during the conversion of the sulfatable flue gas constituents in the reaction zone.

In the aforementioned process variants, it is no longer absolutely essential for sulfur-containing compounds 8 to be additionally introduced when the sulfur oxide concentration in the flue gas (waste gas), as well as the reaction time suffice for a predefined, required sulfation (compare FIG. 8). In the process variants in accordance with FIGS. 3b and 4, it is no longer absolutely essential for sulfur-containing compounds 8 to be additionally introduced when the sulfur concentration in the flue gas (waste gas), due also to $SO_2/SO_3$ recycling 28, as well as the reaction time suffice for a predefined, required sulfation.

Figure 5:
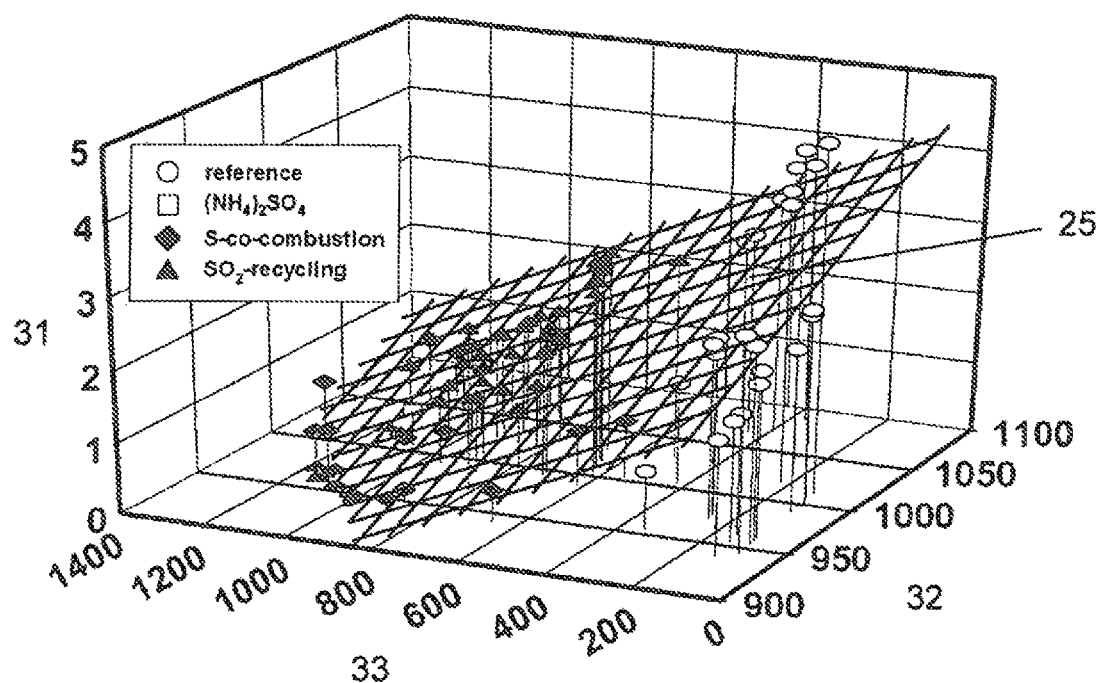
FIG. 5: the molar ratio of chlorine to sulfur in the fly ash as a function of the combustion temperature following the waste gas burnout zone and as a function of the $SO_2$ concentration downstream of the boiler.

FIG. 5 indicates the molar ratio of chlorine to sulfur (Cl/S) 31 in the fly ash as a function of the combustion temperature following the waste gas burnout zone (T [° C.]) 32 and as a function of the $SO_2$ concentration in the waste gas in mg/Nm³ downstream of boiler 33 in an oxygen-containing flue gas atmosphere. The measurement data acquired over the course of various combustion experiments define a characteristics diagram 25, on whose basis it is possible to preselect the required combustion temperature and $SO_2$ concentration to achieve a quantitatively predefined reduction of the chlorine concentration.

Figure 6:
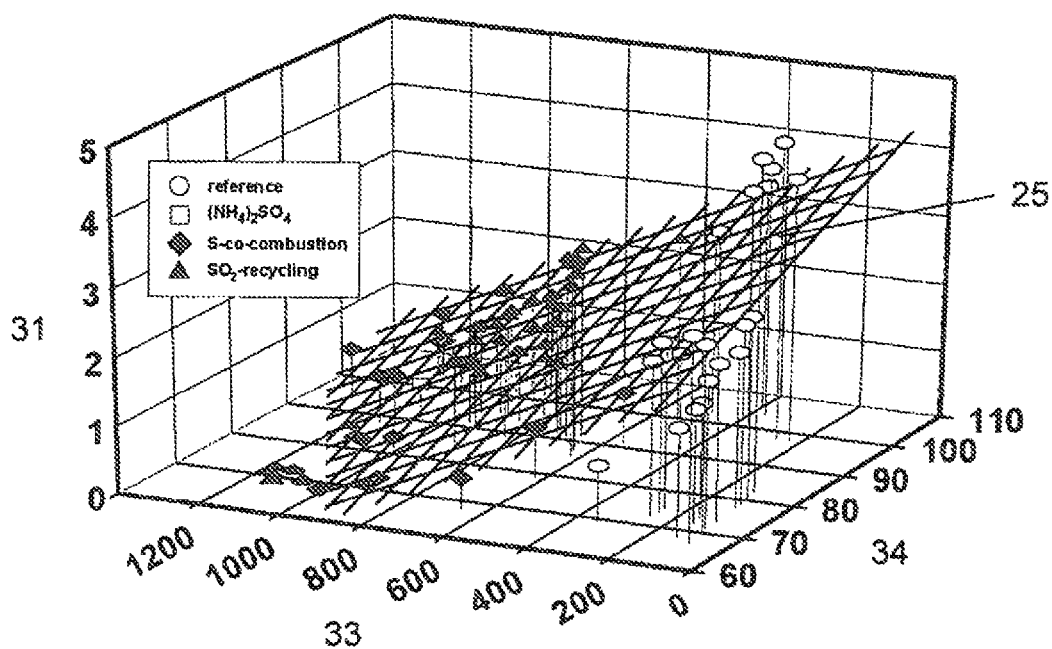
FIG. 6: the molar ratio of chlorine to sulfur in the fly ash as a function of the flue gas cooling rate within the temperature range of 900 →700° C. and as a function of the $SO_2$ concentration downstream of the boiler.

FIG. 6 shows the dependence of the molar ratio of chlorine to sulfur (Cl/S) 31 in the fly ash on the cooling rate in [° C./s] 34 of the flue gas at temperatures ranging from 900° C. to 700° C., and on the $SO_2$ concentration in the waste gas in mg/Nm³ downstream of boiler 33. Generally, a slow cooling of the flue gas in an oxygen- and $SO_2$-containing atmosphere leads to a clearly discernible reduction in the molar chlorine to sulfur ratio in the fly ash, particularly in the case of low $SO_2$ concentrations as well. Thus, a considerable excess of $SO_2$, as used in the related art, is no longer necessary in the case of a slow flue gas cooling within the temperature range mentioned above. Within the scope of the present invention, a dwelling of the flue gas in the reaction chamber beyond a specific dwell time is used for adjusting an advantageous, slowest possible cooling within the mentioned temperature range and thus for reducing chloride through sulfate formation.

In addition, the measurement data clarify that, both in the case of pure domestic waste incineration (without enrichment by $SO_2$), as well as in the case of the co-combustion of sulfur (addition to the fuel), respectively the charging of ammonium sulfate or $SO_2$ to the hot flue gas of the waste gas burnout zone, generally only the $SO_2$ concentration present in the high-temperature region following the waste gas burnout zone is significant for the sulfation process. A low cooling rate in ° C./s 34, i.e., a long dwell time in the reaction chamber (in the high-temperature region, compare FIG. 8, dwell time 38), leads to an efficient sulfation of the fly ash at relatively low $SO_2$ concentrations.

Figure 7:
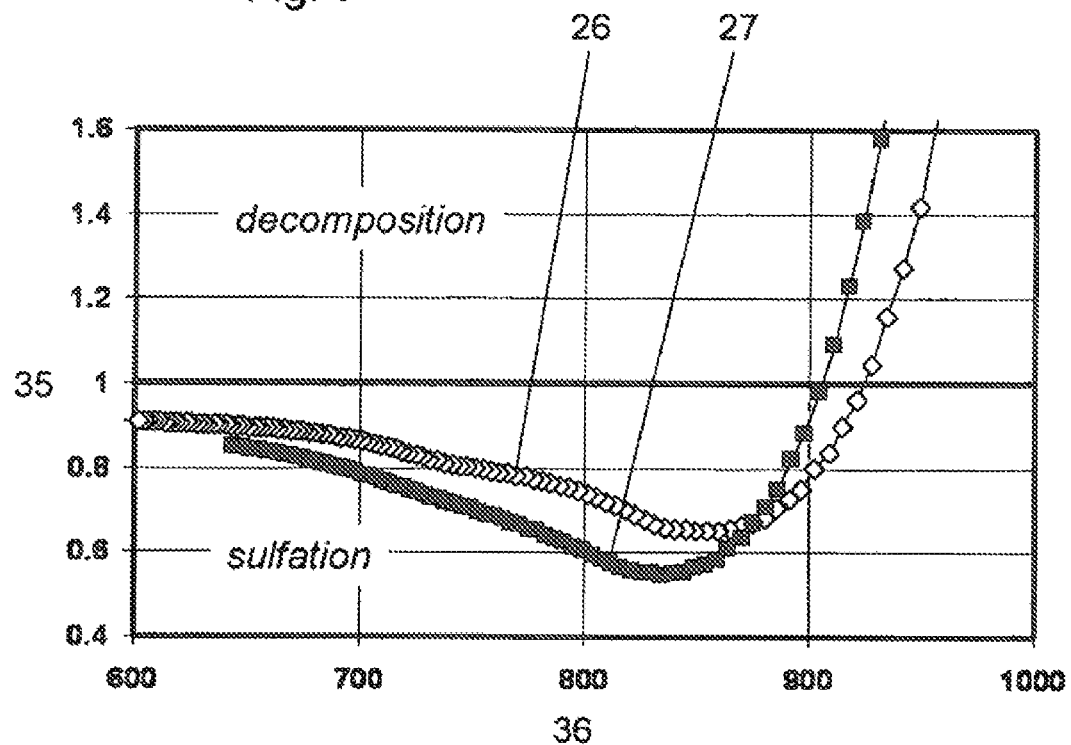
FIG. 7: the consumption of sulfur dioxide during the sulfation (sulfation efficiency) of fly ash as a function of the reaction temperature.

FIG. 7 shows, in addition, the consumption of sulfur dioxide (ratio $C/C_o$) 35 ascertained in the course of laboratory tests in the case of sulfation of fly ash as a function of the reaction temperature in ° C. 36. The reaction times were about six seconds in each case. To this end, two waste incineration ash samples (curves 26 and 27, fabric filter ash) were introduced into a reaction chamber and subjected to the action of a gas mixture of ($N_2$, $O_2$, $H_2O$, $SO_2$) (constant gas flow). The ratio of the measurements of the $SO_2$ concentration in the gas mixture prior to ($C_0$) and after (C) exiting the reaction chamber is an efficiency scale for the sulfation reaction. In the case of $C/C_0$ ratios lower than one, a sulfation reaction takes place. The lower the $C/C_0$ (=$SO_2$ consumption) ratio is, the more efficiently the sulfation reaction proceeds. On the basis of curve progressions 26, respectively, 27, it is possible to determine the optimal temperature range for the sulfation reaction ($C/C_0$). The minimum of the curve progressions indicates a maximum $SO_2$ consumption and thus the optimal reaction temperature range for a fly ash sulfation. The optimal reaction temperature range is between 700 and 900° C., for example, within the aforementioned temperature intervals 800-880° C. On the other hand, an increase in the temperature of the filter ash above the 900 to 920° C. range leads to an unwanted thermal decomposition of the sulfate-containing ash ($C/C_0 > 1$) during the sulfation reaction, accompanied by the release of $SO_2$.

Taking into consideration the measurement data from FIGS. 5 and 6, which reveal an increasing sulfation at a low cooling rate ($dT<70°$ C./s), and assuming a dwell time of the hot flue gases in the reaction chamber of over four seconds, a temperature interval of between 700 and 900° C., for example, of between 800-880° C. is derived for a particularly favorable range for an efficient sulfation of fly ash. The $SO_2$ concentration required for the conversion is able to be reduced by further prolonging the dwell times. To the extent that the $SO_2/SO_3$ concentration in the flue gas generated by the sulfur content specific to the fuel suffices in the material balance for a complete sulfation, the method is particularly economical. In this case, there is no need to additionally introduce sulfur, sulfur compounds or sulfur dioxide into the combustion and purification process.

A complete sulfation of the fly ash already at high temperatures can, for example, allow highly volatile components, such as alkali and metal chlorides (above approximately 700° C.), to be converted into solid sulfates already before entry into the boiler, so that they are precipitable as solids. The sulfates formed have a vapor pressure that is lower by several orders of magnitude than alkali and metal chlorides, and they condense or resublimate in the high-temperature region directly into solid aerosols, thereby promoting a corrosion of a heat-transfer surface to a far lesser degree than volatile chlorides that may condense or resublimate during flue gas cooling.

Therefore, in the ideal case, fly ash that has settled on the downstream boiler surfaces is free from chloride. In this manner, a formation of $Cl_2$ from the ash deposits is also avoided. Under these conditions, there is virtually no formation of dioxins, such as PCDD/F, nor boiler corrosion.

Given a complete sulfation of inorganic Cl compounds in the high-temperature region, i.e., in the absence of volatile alkali and metal compounds (except for Hg), the option is also provided for the sulfate ash particles to be deposited by a high-temperature filtration stage at, for example, 600 to 700° C., already upstream of superheater 12 (compare FIGS. 3*a* and *b*). An embodiment of this kind makes it possible to virtually completely avoid the deposition of ash on the subsequent heat-exchange surfaces. In this manner, the formation of dioxins, such as PCDD/F, in the boiler area is also virtually completely avoided.

Given an efficient hot gas filtration, the need may then be eliminated for a dust separation in a waste gas purification downstream of the boiler. In this option, the heat transfer from the flue gas to the steam circuit, in particular to saturated steam flow 15, is optimal (no fouling). In this context, the waste gas temperatures at the heat exchanger outlet may be reduced further, while taking the acid dew point into account (material selection of the economizer at the cold boiler end), thereby additionally advantageously increasing the energy utilization by reducing the waste gas losses. The need is largely eliminated for measures for periodically cleaning the boiler in the area downstream of the hot gas filter, so that the time between the boiler inspection intervals may be increased accordingly. The boiler corrosion rates are correspondingly low, and the steam parameters (T and p) may be increased significantly, thereby altogether advantageously permitting a significantly improved efficiency in electrical energy generation using steam power processes.

FIG. 8 shows the $SO_2$ concentration required in the flue gas for a sulfation of sulfatable flue gas constituents of a waste incineration downstream of the boiler in mg/Nm³ 33 for the dwell time in the temperature interval of between 700 and 900°, in seconds 38. The results are indicated for different degrees of sulfation (expressed as molar Cl/S ratio of the fly ash), a molar Cl/S ratio of 0.01 indicating a virtually complete conversion, and a ratio of 1.0 indicating a half conversion. The required $SO_2$ concentration was determined in the flue gas after passing through the boiler. The result shows that, with an increasing dwell time of the waste gas at temperatures ranging from 700 to 900° C., the required $SO_2$ concentration downstream of the boiler may be reduced for a desired degree of sulfation (expressed as molar Cl/S ratio).

FIG. 9 shows exemplarily the temperature profiles over time of a flue gas (flue gas cooling curves 39, temperature T in ° C. 40 over time t in seconds 41) during the conversion of the sulfatable flue gas constituents in the reaction zone. The top diagram shows a cooling rate for the passage through a reaction chamber that is favorable for the sulfation reaction, in the temperature interval between 700 and 900° C. (straight connecting lines between points a and b), in comparison to a normal related-art cooling curve without any reaction chamber (dotted line curves 37, cooling rate approximately 60-70°/s), while the bottom diagram shows a diminished cooling in the reaction chamber in the optimal temperature range of between 800 and 880° C., i.e., betweens points c and d). In both cases, the time for cooling from 900° C. to 700° C. (from point a to point b) is within the range of between 4 and 20 seconds, while the time for cooling from 880° C. to 800° C. in the bottom diagram (from point c to point d) is between 2 and 10 seconds.

The present invention is not limited to embodiments described herein; reference should be had to the appended claims.

LIST OF REFERENCE NUMERALS 1 fixed-bed burnout zone
2 introduction of solid fuel
3 introduction of primary air
4 removal of slag
5 flue gas burnout
6 introduction of secondary air
7 two-stage combustion process
8 sulfur-containing compounds
9 waste gas
10 steam boiler
11 evaporator
12 superheater
13 preheater
14 water infeed
15 saturated steam flow
16 dry steam flow (superheated)
17 waste gas purification
18 emission
19 flue gas stream
20 evaporator stage
21 second evaporator stage
22 sulfation zone
23 dust separator
24 sulfate ash particles
25 characteristics diagram
26 top measuring curve
27 bottom measuring curve
28 $SO_2/SO_3$ recycling
29 thermal decomposition
30 silicate discharge
31 molar ratio of chlorine to sulfur (Cl/S) [ ]

32 combustion temperature following the waste gas burnout zone (T [° C.]
33 $SO_2$ concentration downstream of the boiler [mg/Nm$^3$]
34 cooling rate [° C./s]
35 consumption of sulfur dioxide [ ], ratio $C/C_0$
36 reaction temperature [° C.]
37 temperature profile without reaction chamber (related art)
38 dwell time in the temperature interval between 700 and 900° C. [s]
39 flue gas cooling curve
40 temperature [° C.]
41 time [s]

The invention claimed is:

1. A method for entrained-flow sulfation of sulfatable flue gas constituents of an oxygen-containing flue gas in an incineration plant having at least one combustion chamber and a waste gas burnout zone, the method comprising:
passing the oxygen-containing flue gas through the waste gas burnout zone;
tempering the oxygen-containing flue gas by lowering a temperature of the oxygen-containing flue gas; and
passing the oxygen-containing flue gas through a sulfation zone so that the oxygen-containing flue gas has a temperature interval of between 700 and 900° C. during a time period of between 4 and 20 s so as to convert sulfatable flue gas constituents present in the oxygen-containing flue gas to solid sulfate-containing ash particles so as to reduce a halide concentration in ash deposits thereof.

2. The method as recited in claim 1, wherein the sulfatable flue gas constituents includes at least one of $SO_2$ and $SO_3$ present in the oxygen-containing flue gas.

3. The method as recited in claim 1, wherein the sulfatable flue gas constituents include at least one of metal chlorides, alkali chlorides, alkaline earth chlorides, metal bromides, alkali bromides, alkaline earth bromides, metal iodides, alkali iodides, alkaline earth iodides, metal carbonates, alkali carbonates, alkaline earth carbonates, metal oxides, alkali oxides, alkaline earth oxides, metal hydroxides, alkali hydroxides and alkaline earth hydroxides.

4. The method as recited in claim 1, wherein the temperature profile in the temperature interval is between 800 and 880° C. and the time period is between 2 and 10 s.

5. The method as recited in claim 1, wherein the incineration plant further comprises at least one of a heat exchanger and a steam generator, the oxygen-containing flue gas being cooled in the least one of the heat exchanger and the steam generator after the oxygen-containing flue gas exits the sulfation zone.

6. The method as recited in claim 1, further comprising separating the solid sulfate-containing ash particles from the oxygen-containing flue gas after the oxygen-containing flue gas exits the sulfation zone.

7. The method as recited in claim 6, wherein the separating the solid sulfate-containing ash particles from the oxygen-containing flue gas occurs at temperatures of from 500 to 800° C.

8. The method as recited in claim 6, wherein the incineration plant further includes a steam superheater stage of a steam generator, the separating of the solid sulfate-containing ash particles from the oxygen-containing flue gas occurring prior to entry into the steam superheater stage of a steam generator.

9. The method as recited in claim 6, wherein the incineration plant further includes at least one of a heat exchanger and a steam generator, the solid sulfate-containing ash particles being separated from the oxygen-containing flue gas after passing through the at least one of the heat exchanger and the steam generator.

10. The method as recited in claim 6, wherein the incineration plant further includes a thermally insulated treatment stage in which the solid sulfate-containing ash particles are heated to a sulfate decomposition temperature of between 900 and 1300° C. so as to release $SO_2/SO_3$.

11. The method as recited in claim 10, wherein the sulfate-containing ash particles are mixed with at least one of $SiO_2$- and $Al_2O_3$-containing particulate solids prior to being heated.

12. The method as recited in claim 10, further comprising mixing released $SO_2/SO_3$ into the flue gas upstream of the sulfation zone.

13. The method as recited in claim 1, wherein a $SO_2/SO_3$ concentration in the flue gas is adjusted by at least one of adding sulfur-containing compounds to a fuel, co-combustion of sulfur-containing fuels and addition of sulfur or sulfur-containing compounds, so as to form at least one of $SO_2$ and $SO_3$ by thermal decomposition, or by charging at least one of $SO_2$, $SO_3$ and $H_2SO_4$ into the flue gas upstream of the sulfation zone so as to completely convert the sulfatable flue gas constituents.

14. The method as recited in claim 13, wherein the incineration plant further includes one or more heat exchangers, the $SO_2/SO_3$ concentration being adjusted as a function of a measured $SO_2$ concentration to an $SO_2$ value of between 50 to 2000 mg/Nm$^3$ after passing through the one or more heat exchangers.

15. A device for entrained-flow sulfation of sulfatable flue gas constituents of an oxygen-containing flue gas in incineration plants having at least one combustion chamber, the device comprising:
a waste-gas burnout zone; and
a sulfation zone configured to provide the oxygen-containing flue gas within a temperature interval of between 700 and 900° C. during a time period of between 4 and 20 s so as to convert sulfatable flue gas constituents present in the oxygen-containing flue gas to solid sulfate-containing ash particles so as to reduce a halide concentration in ash deposits thereof, wherein the waste gas burnout zone and the sulfation zone are disposed downstream of the at least one combustion chamber.

16. The device as recited in claim 15, further comprising a hot gas filter disposed downstream of the sulfation zone.

17. The device as recited in claim 16, further comprising a heat exchanger disposed downstream of the sulfation zone.

18. The device as recited in claim 17, wherein the hot gas filter is disposed downstream of the heat exchanger.

19. The device as recited in claim 17, wherein the heat exchanger includes an integrated hot gas filter.

20. The device as recited in claim 15, wherein the sulfation zone includes a refractory lining as thermal insulation.

* * * * *